United States Patent
Pellaud et al.

(10) Patent No.: US 10,280,388 B2
(45) Date of Patent: *May 7, 2019

(54) SYSTEMS AND METHODS FOR CUSTOMIZED FERMENTED BEVERAGES

(71) Applicant: ANHEUSER-BUSCH, LLC, St. Louis, MO (US)

(72) Inventors: Jerome Pellaud, New Rochelle, NY (US); Frank Z. Hellwig, New York, NY (US); James P. Keane, West Islip, NY (US); Wilfried Lossignol, Bossut (BE); Aaron Penn, Brooklyn, NY (US); Patrick O'Riordan, South Melbourne (AU)

(73) Assignee: ANHEUSER-BUSCH, LLC, St. Louis, MO (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/507,658

(22) Filed: Oct. 6, 2014

(65) Prior Publication Data
US 2015/0082991 A1 Mar. 26, 2015

Related U.S. Application Data

(63) Continuation of application No. PCT/US2013/035415, filed on Apr. 5, 2013.
(Continued)

(51) Int. Cl.
*C12C 11/11* (2006.01)
*B32B 1/00* (2006.01)
(Continued)

(52) U.S. Cl.
CPC .......... *C12C 11/11* (2013.01); *B01F 3/04801* (2013.01); *B01F 3/04808* (2013.01);
(Continued)

(58) Field of Classification Search
CPC .... B01F 3/04801; B01F 3/04808; B32B 1/00; B32B 7/12; B32B 15/085; B32B 15/20;
(Continued)

(56) References Cited

U.S. PATENT DOCUMENTS 1,006,773 A 10/1911 Millar
1,832,587 A 11/1931 Schneible
(Continued)

FOREIGN PATENT DOCUMENTS

CA 2264969 9/2000
CN 1931071 A 3/2007
(Continued)

OTHER PUBLICATIONS

Erowid, Beer Alcohol and Calories (2000), obtained May 29, 2015 from https://www.erowid.org/chemicals/alcohol/alcohol_info1.shtml.
(Continued)

*Primary Examiner* — Brian W Jennison
(74) *Attorney, Agent, or Firm* — Holland & Hart LLP (57) ABSTRACT

A system for making a personalized malt-based beverage may comprise at least one packaged base liquid and at least one separately packaged flavor ingredient. The at least one packaged base liquid may comprise at least about 0.1% wt ethyl alcohol, at least about 3% wt malt extract solids, and a carbon dioxide level between about zero grams per liter and about 1.5 grams per liter. The separately packaged flavor ingredient may comprise a dry ingredient.

19 Claims, 7 Drawing Sheets

Related U.S. Application Data (60) Provisional application No. 61/620,859, filed on Apr. 5, 2012, provisional application No. 61/753,891, filed on Jan. 17, 2013.

(51) Int. Cl.

| | | |
|---|---|---|
| *B65D 77/06* | (2006.01) | |
| *C12C 5/02* | (2006.01) | |
| *B65D 5/06* | (2006.01) | |
| *B01F 3/04* | (2006.01) | |
| *B65D 85/808* | (2006.01) | |
| *C12C 12/00* | (2006.01) | |
| *B65D 5/56* | (2006.01) | |
| *B65D 5/74* | (2006.01) | |
| *C12C 5/00* | (2006.01) | |
| *B65D 21/02* | (2006.01) | |
| *B65D 25/04* | (2006.01) | |
| *B65D 85/72* | (2006.01) | |
| *B32B 7/12* | (2006.01) | |
| *B32B 15/085* | (2006.01) | |
| *B32B 15/20* | (2006.01) | |
| *B32B 27/08* | (2006.01) | |
| *B32B 27/10* | (2006.01) | |
| *B32B 27/30* | (2006.01) | |
| *B32B 27/34* | (2006.01) | |
| *B65B 3/00* | (2006.01) | |
| *B65B 51/04* | (2006.01) | |
| *B65D 71/00* | (2006.01) | |
| *B67D 1/00* | (2006.01) | |
| *B67D 1/04* | (2006.01) | |

(52) U.S. Cl.
CPC .............. *B32B 1/00* (2013.01); *B32B 7/12* (2013.01); *B32B 15/085* (2013.01); *B32B 15/20* (2013.01); *B32B 27/08* (2013.01); *B32B 27/10* (2013.01); *B32B 27/308* (2013.01); *B32B 27/34* (2013.01); *B65B 3/00* (2013.01); *B65B 51/04* (2013.01); *B65D 5/067* (2013.01); *B65D 5/563* (2013.01); *B65D 5/746* (2013.01); *B65D 21/02* (2013.01); *B65D 25/04* (2013.01); *B65D 71/0088* (2013.01); *B65D 77/06* (2013.01); *B65D 85/72* (2013.01); *B65D 85/808* (2013.01); *C12C 5/00* (2013.01); *C12C 5/026* (2013.01); *C12C 12/00* (2013.01); *B01F 2215/0068* (2013.01); *B32B 2307/726* (2013.01); *B32B 2307/7244* (2013.01); *B32B 2439/00* (2013.01); *B32B 2439/40* (2013.01); *B32B 2439/60* (2013.01); *B67D 1/0072* (2013.01); *B67D 1/0418* (2013.01)

(58) Field of Classification Search
CPC ....... B32B 27/08; B32B 27/10; B32B 27/308; B32B 27/34; B32B 2215/0068; B32B 2307/7244; B32B 2307/726; B32B 2439/00; B32B 2439/40; B65B 3/00; B65B 51/04; B65D 5/067; B65D 5/563; B65D 5/746; B65D 21/02; B65D 25/04; B65D 71/0088; B65D 77/06; B65D 85/72; B65D 85/808; C12C 5/00; C12C 5/026; C12C 12/00; C12C 11/11
See application file for complete search history.

(56) References Cited

U.S. PATENT DOCUMENTS

| | | | |
|---|---|---|---|
| 2,220,146 A | 11/1940 | Curry | |
| 2,805,846 A | 9/1957 | Dewan | |
| 4,127,503 A | 11/1978 | Yoshikawa | |
| 4,186,215 A | 1/1980 | Buchel | |
| 4,316,409 A | 2/1982 | Adams et al. | |
| 4,399,158 A | 8/1983 | Bardsley | |
| 4,424,260 A | 1/1984 | Pupp | |
| 4,514,994 A | 5/1985 | Mabb | |
| 4,526,730 A | 7/1985 | Cochran | |
| 4,636,337 A * | 1/1987 | Gupta | A23L 2/54 141/311 R |
| 4,679,602 A | 7/1987 | Hollis | |
| 4,695,468 A | 9/1987 | Boston | |
| 4,785,977 A | 11/1988 | Ball | |
| 4,821,630 A | 4/1989 | Roberts | |
| 4,836,414 A | 6/1989 | Credle, Jr. | |
| 4,867,209 A * | 9/1989 | Santoiemmo | B01F 3/04801 141/19 |
| 4,947,739 A | 8/1990 | Owen | |
| 5,354,569 A | 10/1994 | Brown | |
| 5,366,745 A | 11/1994 | Daden | |
| 5,384,135 A | 1/1995 | Caluwaerts | |
| 5,437,143 A | 8/1995 | Culpepper | |
| 5,460,846 A * | 10/1995 | Stumphauzer | A23L 2/54 261/DIG. 7 |
| 5,501,375 A * | 3/1996 | Nilson | B65D 25/465 222/394 |
| 5,565,149 A * | 10/1996 | Page | B01D 19/0031 210/321.8 |
| 5,618,572 A | 4/1997 | Tripp et al. | |
| 5,911,665 A | 6/1999 | Heydarpour | |
| 6,093,436 A | 7/2000 | Zheng et al. | |
| 6,094,892 A | 8/2000 | Lees | |
| 6,120,730 A | 9/2000 | Palaniappan | |
| 7,008,652 B2 | 3/2006 | Effler | |
| 7,302,974 B2 | 12/2007 | Oono et al. | |
| 7,384,674 B2 | 6/2008 | Andersson et al. | |
| 7,798,056 B2 | 9/2010 | Kramer | |
| 7,935,400 B2 | 5/2011 | Toft | |
| 9,016,037 B2 | 4/2015 | Herman | |
| 9,339,056 B2 | 5/2016 | Njaastad | |
| 9,803,163 B2 | 10/2017 | Pellaud et al. | |
| 2002/0012689 A1 | 1/2002 | Stillman | |
| 2002/0078831 A1 | 6/2002 | Cai | |
| 2002/0094942 A1 | 7/2002 | Danneels | |
| 2003/0232108 A1 | 12/2003 | Effler | |
| 2004/0142067 A1 | 7/2004 | Le Clerc et al. | |
| 2004/0154948 A1 | 8/2004 | Fux | |
| 2005/0181154 A1 | 8/2005 | Toft | |
| 2007/0017632 A1 | 1/2007 | Toft | |
| 2007/0158371 A1 | 7/2007 | Lupfer | |
| 2007/0172615 A1* | 7/2007 | Darr | B32B 27/08 428/35.7 |
| 2007/0211967 A1 | 9/2007 | Murray | |
| 2007/0248719 A1 | 10/2007 | Koch et al. | |
| 2007/0271876 A1 | 11/2007 | Davies | |
| 2008/0247682 A1 | 10/2008 | Murray | |
| 2009/0113848 A1 | 5/2009 | Santi | |
| 2009/0140006 A1 | 6/2009 | Vitantonio | |
| 2009/0283553 A1* | 11/2009 | Hoss | B67D 1/0418 222/396 |
| 2009/0297741 A1 | 12/2009 | Oshita | |
| 2010/0028515 A1* | 2/2010 | Gormley | A23L 2/54 426/477 |
| 2010/0096040 A1 | 4/2010 | Litto | |
| 2010/0112255 A1 | 5/2010 | Fayet | |
| 2010/0221404 A1 | 9/2010 | Little | |
| 2010/0291261 A1 | 11/2010 | Deuter | |
| 2011/0000812 A1 | 1/2011 | Laupie | |
| 2011/0027428 A1 | 2/2011 | Bekele | |
| 2011/0036062 A1 | 2/2011 | Borsari et al. | |
| 2011/0046236 A1 | 2/2011 | Czarnik et al. | |
| 2011/0147406 A1* | 6/2011 | Grill | B67D 1/0418 222/1 |

(56) References Cited

U.S. PATENT DOCUMENTS

| | | |
|---|---|---|
| 2011/0210144 A1 | 9/2011 | Lupfer |
| 2011/0300275 A1 | 12/2011 | Lackey et al. |
| 2012/0021108 A1 | 1/2012 | Baumann |
| 2012/0107455 A1 | 5/2012 | Briggs |
| 2012/0167991 A1 | 7/2012 | Feilner |
| 2013/0292857 A1 | 11/2013 | Connors |
| 2014/0004241 A1 | 1/2014 | Hatherell |
| 2014/0079867 A1 | 3/2014 | Pellaud |
| 2015/0064325 A1 | 3/2015 | Pellaud |
| 2015/0151258 A1 | 6/2015 | Cohen |
| 2015/0353335 A1 | 12/2015 | Breault |
| 2016/0332124 A1 | 11/2016 | Cohen |

FOREIGN PATENT DOCUMENTS

| | | |
|---|---|---|
| DE | 202007007045 U1 | 9/2008 |
| EP | 3067111 A1 | 9/2016 |
| GB | 2133302 A | 7/1984 |
| JP | 2007312673 A | 12/2007 |
| WO | 0023357 A1 | 4/2000 |
| WO | 02044058 | 6/2002 |
| WO | 2007032719 | 3/2007 |
| WO | WO 2011029571 A1 | 3/2011 |

OTHER PUBLICATIONS

Brewer's Friend: Beer Styles—IBU Chart Graph (Bitterness Range (2009), obtained May 29, 2015 from http://www.brewersfriend.com/2009/01/24/beer-styles-ibu-chart-graph-bitterness-range/.

English translation of DE 202007007045. Oct. 23, 2008.

Manning, Brewing Techniques: Understanding Specific Gravity and Extract, 1993, available from http://morebeer.com/brewingtechniques/library/backissues/issue1.3/manning.hmtl.

PCT International Search Report for PCT International Patent Application No. PCT/US2013/035415, dated Aug. 7, 2013.

Nihtianov, S.N. "Indirect Conductivity Measurement of Liquids in Flexible Containers." http://ieeexplore.ieee.org/xpls/abs_al.jsp?arnumber=610260&tag=1.

Definition of "rigid." The Oxford Pocket Dictionary of Current English, 2009. http://www.encyclopedia.com/doc/10999-rigid.htm.

* cited by examiner

SYSTEMS AND METHODS FOR CUSTOMIZED FERMENTED BEVERAGES

RELATED APPLICATIONS

This application claims priority to U.S. Provisional Patent Application No. 61/620,859 to O'Riordan et al., filed on 5 Apr. 2012; and U.S. Provisional Patent Application No. 61/753,891 to O'Riordan et al., filed on 17 Jan. 2013, and the disclosure of each is incorporated fully herein by this reference.

TECHNICAL FIELD

In general, the present disclosure relates to personalized beverages. More specifically, the present disclosure relates to fermented beverages, such as malt-based beverages, that may be personalized to a consumer's preference, such as by combining ingredients together.

BACKGROUND

In recent years, malt-based beverages, and especially beers, are a fast growing market in many countries such as China and India. In many of these countries, the taste and beer-type preferences are culturally different from markets such as North and South America and Europe. Most breweries operating world-wide, however, provide a limited number of beer types, and hence, beer tastes. Due to globalization, the availability of specialized beer types that meet specific consumer demands becomes a challenge, both in terms of logistics and in terms of the amount of different beer types and tastes to be developed and produced.

Beer taste is dependent on the ingredients used (e.g., malt-type, adjunct levels, hops type and levels, other ingredients such as fruit flavors, water composition, etc.) and operational settings (e.g., boiling time, yeast type used for fermentation, fermentation temperature profile, filtration, etc.).

Brewing finished beer, wherein all the ingredients are introduced into the beer prior to bottling, has a major drawback in that the formulation and thus the taste, smell, color and other organoleptic properties of the beer are fixed.

A partial solution to this drawback has been provided with for example in U.S. Pat. No. 7,008,652, which discloses a method of manufacturing a colorless, flavorless and odorless fermented malt-based stock for subsequent flavoring having a total solids content of less than 1%.

The method disclosed in U.S. Pat. No. 7,008,652, however, provides a fermented malt-based stock composition that is substantially free of beer-characteristic. Accordingly, flavoring of such malt-based stock is perceived to be limited due to the large amount of flavors to be added. Additionally, it appears that a natural tasting beer would be difficult to achieve utilizing such malt-based stock.

Another drawback of the method according to U.S. Pat. No. 7,008,652 is that the addition of flavors, especially due to the large amount, remains difficult and specialists work, making it difficult for end-consumers to personalize the malt-base according to their own desire.

In view of the foregoing, there remains a need for individualized malt-based beverages meeting a personal organoleptic profile. Additionally, there is a need for systems, methods, and devices that facilitate a relatively easy preparation of such malt-based beverages by consumers. Furthermore, there is a need for systems, methods, and devices that provide consumers with the experience of preparing a truly natural malt-based beverage.

DISCLOSURE OF THE INVENTION

In one aspect of the present disclosure, a system for making a personalized malt-based beverage may comprise an individually packaged base liquid for making personalized malt-based beverages may comprise at least about 0.1% wt ethyl alcohol, at least about 3% wt malt extract solids, and a carbon dioxide level between about 0 grams per liter and about 1.5 grams per liter.

In a further aspect, which may be combined with any other aspects, the at least one separately packaged flavor ingredient may comprise a bittering ingredient.

In a further aspect, which may be combined with any other aspects, the bittering ingredient may comprise hops.

In a further aspect, which may be combined with any other aspects, the packaged base liquid may further comprise between about 3% wt malt extract solids and about 5.5% wt malt extract solids.

In a further aspect, which may be combined with any other aspects, the packaged base liquid may further comprise less than about 6 International Bitterness Units.

In a further aspect, which may be combined with any other aspects, the packaged base liquid may further comprise less than about 3 International Bitterness Units.

In a further aspect, which may be combined with any other aspects, the packaged base liquid may further comprise about zero International Bitterness Units.

In a further aspect, which may be combined with any other aspects, the packaged base liquid may further comprise an ethyl alcohol level of at least 0.5% wt.

In a further aspect, which may be combined with any other aspects, the packaged base liquid may further comprise an ethyl alcohol level of at least 1% wt.

In a further aspect, which may be combined with any other aspects, the packaged base liquid may further comprise an ethyl alcohol level between about 3% wt and about 12% wt.

In a further aspect, which may be combined with any other aspects, the system may further comprise a carbonating vessel.

In a further aspect, which may be combined with any other aspects, the at least one flavor ingredient may be a dry ingredient.

In a further aspect, which may be combined with any other aspects, the at least one flavor ingredient may be packaged within a water permeable container.

In a further aspect, which may be combined with any other aspects, the packaged base liquid may be contained with packages having a volume between about 0.5 liter and about 10 liters.

In one aspect of the present disclosure, a method for manufacturing a personalized malt-based beverage may comprise providing a distributable package containing a malt-based beverage base composition, the base composition having a CO2 level ranging between 0 and 1.5 g/l, providing a flavored liquid composition comprising at least one flavorant, and adding at least one flavored liquid composition to said base composition.

In a further aspect, which may be combined with any other aspects, the method may further comprise providing at least one ingredient comprising at least one extractable flavorant, and extracting said at least one flavorant from said at least one ingredient to obtain said flavored liquid composition.

In a further aspect, which may be combined with any other aspects, said base composition may be a fermented composition.

In a further aspect, which may be combined with any other aspects, said base composition may have an alcohol content of at least 0.1 w %.

In a further aspect, which may be combined with any other aspects, said base composition may lack at least one beer characteristic flavor component desired in the malt-based beverage to manufacture and has a total solids content of at least more than 1%.

In a further aspect, which may be combined with any other aspects, extracting said flavorant from said at least one ingredient may comprise boiling said ingredient in water or extracting said flavorant in alcohol.

In a further aspect, which may be combined with any other aspects, adding the flavored liquid composition to said base composition may comprise diluting said base composition with respect to at least one component.

In a further aspect, which may be combined with any other aspects, the method may further comprise carbonating said base composition.

In a further aspect, which may be combined with any other aspects, carbonation of the base composition may be performed after addition of the flavored liquid composition thereto.

In a further aspect, which may be combined with any other aspects, the method may further comprise providing two or more different malt-based beverage base master compositions, mixing said base master compositions to obtain the base composition.

In a further aspect, which may be combined with any other aspects, the ingredient comprising at least one flavorant may be chosen from the group comprising a bittering ingredient, an aromatic ingredient, and mixtures thereof.

In a further aspect, which may be combined with any other aspects, the method may further comprise adding at least one of hops and hops derivatives to the base composition.

In a further aspect, which may be combined with any other aspects, adding at least one of hops and hops derivatives to the base composition may be performed during carbonation.

In a further aspect, which may be combined with any other aspects, the malt-based beverage obtained may be a beer.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements.

BEST MODE(S) FOR CARRYING OUT THE INVENTION

Embodiments described herein provide devices, systems and methods for the customization and personalization of fermented beverages, such as fermented malt-based beverages, by consumers. In the present disclosure, it should be understood that the present system will be described with reference to malt-based beverages. However, the present systems and methods equally apply to all cereal and pseudo-cereal based beverages, including, but in no way limited to beverages based on maize, rice, wheat, barley, sorghum, millet, oats, triticale, rye, buckwheat, fonio, and quinoa. In some embodiments, at least one base liquid may be manufactured that includes water and ethyl alcohol, and other ingredients derived from the brewing and fermentation of sugars, such as sugars extracted from malted grain. The base liquid may be decarbonated after fermentation, to provide a still base liquid. The still base liquid, which may be substantially free of carbon dioxide or other dissolved gasses, may then be packaged, such as in a carton. The base liquid may then be shipped and sold to consumers, where it may be combined with at least one flavor, inserted into a durable container, and carbonated to provide a personalized beverage.

Figure 1:
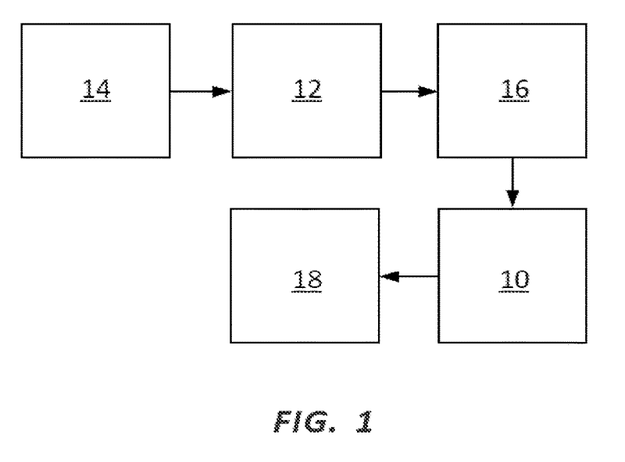
FIG. 1 is a schematic process diagram depicting stages of the manufacture process for a base liquid for making a personalized malt-based beverage, according to an embodiment of the present disclosure.

In some embodiments, a base liquid 10 for making a personalized fermented beverage may be manufactured by fermenting a wort 12 comprising fermentable sugars and water, as illustrated in FIG. 1. The fermentable sugars may be obtained by mashing a carbohydrate source 14 (i.e., utilizing enzymes to convert complex sugars to simple, fermentable sugars), such as malted barley and/or adjuncts such as one or more of maize, corn, rye, wheat, oat, rice, millet, sorghum, cassava root, potato, yam, agave, and persimmon. After mashing, liquid wort 12 may be separated from solids (e.g., grain husks) from the carbohydrate source by lautering. Optionally, fermentable sugars may be added to the wort 12 that do not require mashing, such as one or more of honey, cane sugar, beet sugar, molasses, fruit sugar (fructose), agave syrup, maple syrup, and corn sugar.

Various base liquids 10 may be prepared by utilizing different ingredients for preparing the wort 12. Ingredients may be selected to provide a desired color, a desired ethyl alcohol content, and desired flavor profiles. For example, a roasted barley malt (e.g., black patent malt and/or chocolate malt) may be added to provide a dark base liquid 10. For another example, adjuncts such as rice sugar, corn sugar, and/or cane sugar may be added to provide additional ethyl alcohol in a base liquid without adding significant flavor or color, such as for a light colored base liquid 10. In yet another example, wheat may be added to provide a wheat base liquid 10.

The wort 12 may then be boiled, and optionally, a small amount of bittering agents, such as hops or hops derivatives, may be added prior to or during the boiling process. In some embodiments, no bittering agents may be added. For example, the wort 12, and the resulting base liquid 10, may include less than about 6 International Bitterness Units (IBUs) (i.e., having less than about 6 milligrams of isomerized alpha acid per one liter of liquid). In another example, the wort 12, and the resulting base liquid 10, may include less than about 3 IBUs. In yet another example, the wort 12, and the resulting base liquid 10, may include about zero IBUs.

After boiling, the wort 12 may be cooled and yeast may be added to ferment the wort 12 (e.g., to convert the fermentable sugars in the wort 12 to ethyl alcohol and carbon dioxide). The yeast and fermentation process may be selected to affect the flavor of the resulting base liquid 10. For example, a top fermenting yeast (i.e., an ale yeast) may be selected and fermenting temperatures may be relatively warm (e.g., between about 13° C. and about 24° C.) to provide a base liquid 10 having flavors of an ale style beer. For another example, a bottom fermenting yeast (i.e., a lager yeast) may be selected and fermenting temperatures may be relatively cool (e.g., between about 0° C. and about 13° C.) to provide a base liquid 10 having flavors of a lager style beer. In yet another example, a bottom fermenting yeast (i.e., a lager yeast) may be selected and fermenting temperatures may be relatively warm (e.g., between about 13° C. and about 24° C.) to provide a base liquid 10 having flavors of a steam style beer.

When the fermentation process has completed, a carbonated base liquid 16 may result that comprises an ethyl alcohol level of at least 0.1% wt and dissolved carbon dioxide produced by the yeast during fermentation. In some embodiments the base liquid 10 may comprise an ethyl alcohol level of at least 0.5% wt. In further embodiments, the base liquid 10 may comprise an ethyl alcohol level of at least 1% wt. For example, the base liquid 10 may comprise an ethyl alcohol level between about 3% wt and about 12% wt.

Prior to packaging, the carbonated base liquid 16 may be decarbonated by known methods, or new methods, to remove substantially all of the dissolved carbon dioxide gas, and any other gases, to provide the base liquid 10. For example, after decarbonation the base liquid 10 may have a carbon dioxide level between about zero grams per liter and about 1.5 grams per liter. According to one embodiment, after decarbonation, the base liquid 10 may have a carbon dioxide level between about zero grams per liter and about 1.0 grams per liter. According to yet another embodiment, after decarbonation, the base liquid 10 may have a carbon dioxide level between about zero grams per liter and about 0.6 grams per liter. Additionally, after fermentation, and prior to packaging, the base liquid 10 may be filtered to remove a portion of the solids.

Optionally, a carbonated liquid base 16 may be transported in bulk, such as by a tanker truck, from a brewery to a separate packaging plant. The carbonated base liquid 16 may then be decarbonated and packaged into individual containers, such as cartons, at the packaging plant to provide an individually packaged base liquid 18. The generation of multiple decarbonated base liquids provides the system with maximum customization ability. According to one exemplary embodiment, multiple decarbonated base liquids may be used with varying characteristics, allowing the consumer to mix and match various combinations, thereby allowing the consumer to truly customize their beverage. According to this exemplary embodiment, the individually packaged base liquid 18 may be available in varying levels of alcohol content, flavor, and bitterness level, to allow for consumer customization.

In some embodiments, the carbonated base liquid 16 may be decarbonated inline prior to packaging. The inline decarbonation may be conducted within a space, such as a cylindrical chamber, that may be subjected to a partial vacuum. Prior to being introduced into the space, the carbonated base liquid 16 may be heated, such as to a temperature between about 35° C. and about 38° C. The space may be maintained at a partial vacuum pressure, such as an absolute pressure of about 10 kPa.

The heated, carbonated base liquid 16 may be injected onto the space via a nozzle, which may distribute the base liquid over a surface within the space, such as a wall defining the space. Within the space, the heat and vacuum conditions may cause the carbon dioxide dissolved within the carbonated base liquid 16 to separate from the liquid and be withdrawn from the space. After the carbon dioxide has been substantially removed from the carbonated base liquid 16 to form the base liquid 10, the base liquid 10 may settle at the bottom of the space and be withdrawn from the space to a filler apparatus, such as those known in the art, for packaging to provide the packaged base liquid 18.

Figure 2A:
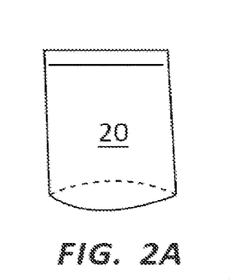
FIGS. 2A-2C are isometric views of various non-rigid packages containing a base liquid, such as may be made by the process of FIG. 1.
Figure 2B:
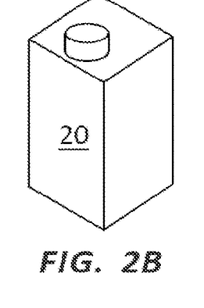
Figure 2C:
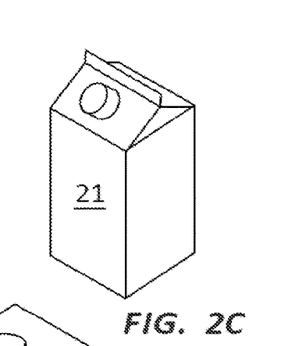

As the base liquid 18 is substantially free of carbonation (i.e., dissolved gases), the individual containers utilized for the packaged base liquid 18 may be non-rigid (e.g., soft-sided or flexible) containers, and the base liquid 18 may be hermetically sealed within an orifice defined by a non-rigid wall of the container. In some embodiments, a non-rigid container may be formed from a flexible sheet material, which may comprise one or more of paper pulp, a polymer, and/or a metal foil. For example, a non-rigid container may be comprised of a flexible sheet material comprising a multi-layer laminate having a first polyethylene layer, a paper layer, a second polyethylene layer, an aluminum foil layer, a polyethylene adhesion layer, and a third polyethylene layer. Accordingly, although a non-rigid container may be suitable for a liquid that is substantially free of any dissolved gases, non-rigid containers may not be suitable for carbonated liquids, as the flexible sides of a non-rigid container may not provide support for a pressure difference between the content therein and the ambient environment. The non-rigid containers 19, 20, 21 may be configured to hold between about 0.5 liter and about 10 liters. For example, the individual containers may be foil-on-foil, gusseted retort packages 19, as shown in FIG. 2A, having a gusseted base configured to facilitate a vertical orientation of the gusseted retort packages 19. For another example, the individual containers may be an aseptic composite material carton 20, such as the Tetra Gemina Aseptic® available from Tetra Pak Inc. of Vernon Hills, Ill., USA, as shown in FIG. 2B. For a further example, the individual containers may be a carton 21 with a gusseted top, such as the Tetra Rex® available from Tetra Pak Inc. of Vernon Hills, Ill., USA, as shown in FIG. 2C. Any number of flexible materials configured to hermetically store a liquid, including polymers, may be used to form the individual containers of the present exemplary system and method.

Figure 4:
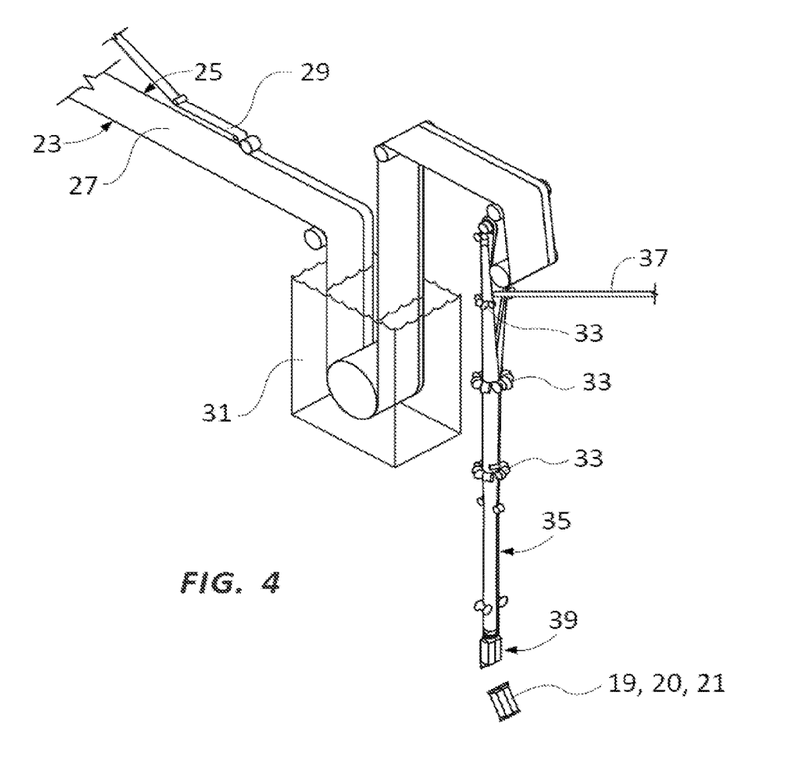
FIG. 4 is an isometric view of a processing line for manufacturing non-rigid packages containing a base liquid, such as may be made by the process of FIG. 1.

An example of a portion of a process for forming non-rigid containers 19, 20, 21 from sheet material is illustrated in FIG. 4. A flexible sheet material 23 may be provided, such as from a roll, the flexible sheet material 23 having a first edge 25 and an opposing second edge 27. A sealing strip 29 may also be provided, such as from a roll. The sealing strip 29 may then be adhered to the first edge 25 of the flexible sheet material 23, so that it extends over the first edge 25. The flexible sheet material 23 with the sealing strip 29 adhered thereto may be sanitized in a chemical bath, such as a hydrogen peroxide bath 31.

Figures 5, 6:
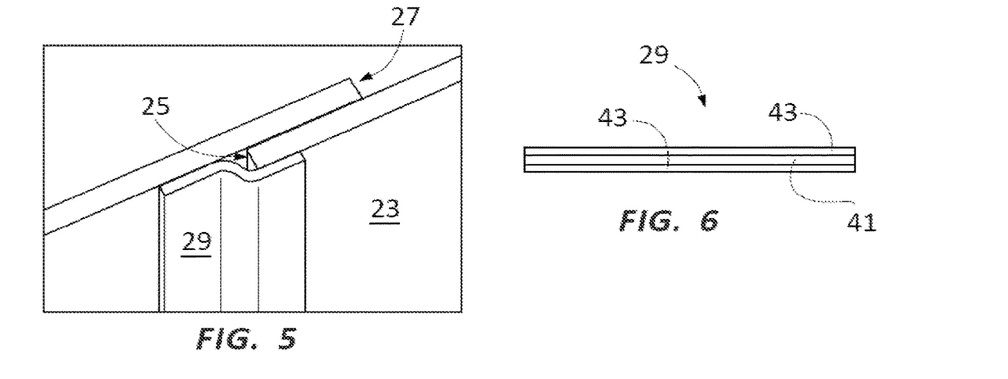
FIG. 5 is a detail view of a non-rigid package manufactured, such as made on the processing line of FIG. 4.
FIG. 6 is a cross-sectional detail view of a sealing strip for use in non-rigid packages, such as shown in FIG. 5.

The flexible sheet material 23 may then be creased and folded with progressive roller units 33 to form a tube 35. According to one exemplary embodiment, the tube 35 may have any number of cross-sectional shapes including, but in no way limited to, circular, oval, square, rectangular, or triangular cross-section. To form the tube 35, the first and second edges 25 and 27 of the sheet material 23 may be positioned to overlap and be secured together with an adhesive. Additionally, the portion of the sealing strip 29 that overhangs the first edge 25 may be adhered to the sheet material 23 proximate to the second edge 27, to provide a longitudinal or transverse seal along the seam within the interior of the tube 35 (and thus within the interior of the resulting non-rigid containers 19, 20, 21), as shown in FIG. 5.

Referring again to FIG. 4, the tube may then be filled with base liquid 10 via a delivery tube 37 prior to segments of the tube 35 being sealed to form package precursors 39, which are then cut from the tube 35 to provide discrete non-rigid containers 19, 20, 21 of packaged base liquid 18.

To maintain freshness of the packaged base liquid 18, the sealing strip 29 that provides the longitudinal transverse seal of the non-rigid container 19, 20, 21 may include a material layer that provides an oxygen barrier. In some embodiments, the sealing strip 29 may comprise a layer of ethylene vinyl alcohol (EVOH). For example, as shown in FIG. 6, the sealing strip 29 may comprise a plurality of layers and may comprise a layer 41 of EVOH sandwiched between layers 43 of polyethylene terephthalate (PET). Alternatively, the sealing strip 29 may be formed of a laminate that includes any number of polymer layers, including, but in no way limited to nylon, to increase the hermetic seal of the resulting non-rigid container 19, 20, 21.

Figure 13:
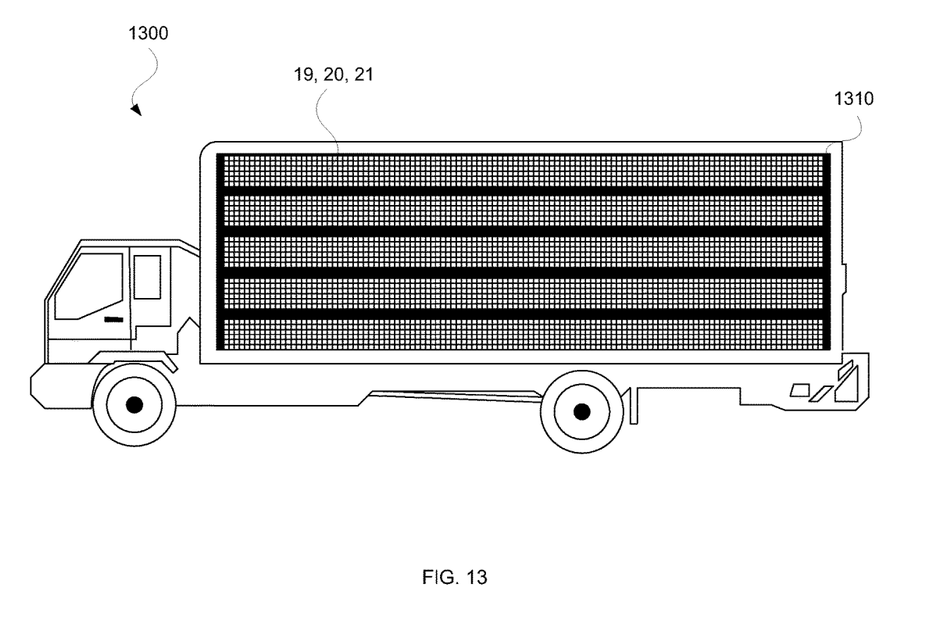
FIG. 13 is a side cross-sectional view of a shipping vehicle containing a number of non-rigid packages of decarbonated beer base efficiently stacked, according to an embodiment of the present disclosure.

The use of non-rigid containers 19, 20, 21 may facilitate cost effective shipping of the packaged base liquid 18. Non-rigid containers 19, 20, 21 may be relatively light weight, may be configured to stack efficiently, reducing dead space between packages, and may be allow relatively rough handling. For example, the packages may be stacked in a geometrically efficient manner based on a flat-sided geometry, and such stacked packages may be efficiently shipped. According to one exemplary embodiment, packages having a square or rectangular cross-section may be stacked with adjacent flat sides touching, thereby eliminating unused volumes in transportation containers. FIG. 13 illustrates a transportation truck 1300 having a number of non-rigid containers 19, 20, 21 having a rectangular cross-section, stacked in an efficient manner. As illustrated in FIG. 13, each non-rigid container 19, 20, 21, with the exception of the edge containers, is stacked with a container immediately above, below, to the left, and to the right. This efficient stacking system, mating adjacent planar surfaces, allows for the shipment of the maximum volume of product. In contrast, traditional containers used for carbonated alcoholic beverages were cylindrically shaped, resulting in a high level of unused space when shipped. As further illustrated in FIG. 13, a number of stacking dividers 1310 are included between multiple layers of flexible containers 19, 20, 21 to ensure that the maximum compression levels of the flexible containers is not exceeded by the bottom container supporting all containers resting thereon.

Non-rigid containers 19, 20, 21 may also facilitate reliability and quality of the product received by an end-consumer. Non-rigid containers 19, 20, 21 may facilitate the pasteurization, or ultra-pasteurization, of the packaged base liquid 18 after packaging. This may eliminate the possibility of the packaged base liquid 18 from being contaminated with microorganisms. Non-rigid containers 19, 20, 21 may additionally facilitate the inclusion of labels and information directly on the package, which may be aesthetically pleasing to an end-consumer. Furthermore, non-rigid containers 19, 20, 21 may be environmentally friendly. Although there are many advantages to utilizing non-rigid containers 19, 20, 21, rigid containers, such as bottles and cans comprised of one or more of plastic, glass, and metal, may also be utilized.

In some embodiments, the packaged base liquid 18 may have a composition comprising a water content between about 89% wt and about 94% wt, a malt extract solids (e.g., beer flavor) content between about 3% wt and about 5.5% wt, a carbon dioxide content less that about 0.15% wt, and an ethyl alcohol content between about 0.1% wt and about 8% wt. Additionally, as previously discussed herein, the base liquid 10 or the packaged base liquid 18 may be pasteurized, or ultra-pasteurized, to deactivate or kill any remaining yeast and/or other microorganisms therein.

Figure 3:
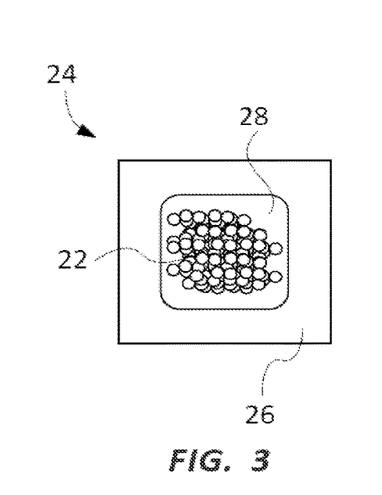
FIG. 3 is a top view of a package containing a flavor ingredient for making a personalized malt-based beverage, according to an embodiment of the present disclosure.

In some embodiments, flavor ingredients 22 may be prepared and packaged, as shown in FIG. 3. Flavor ingredients 22 may be selected to impart any of a variety of flavors to a base liquid 10. For flavor packets 24 configured for utilization in personalized beers, flavor ingredients 22 may be selected that correspond to flavors that are found in various styles of beers.

Bittering ingredients may be selected for a bittering flavor packet 24. Such bittering ingredients may include one or more of hops, dandelion, pine, spruce, nettle, scotch broom, heather, and other bittering ingredients. Likewise, aromatic and/or flavor ingredients may be selected for an aromatic flavor packet 24. Such aromatic ingredients may include one or more of hops; citrus peel; coffee; tea; oak; charred wood; spices such as cinnamon, coriander, and curacao; fruits such as cherry, raspberry, peach, apple, and apricots; vegetables such as pumpkin, and blue agave nectar; and cereals such as malted barley, rye, wheat, rice, and millet.

The flavor ingredients 22 for each flavor packet 24 may be dried, to prevent spoilage. Optionally, the flavor ingredients 22 may also be ground or milled to facilitate flavor extraction and facilitate measurement and packaging of the flavor ingredients 22. In some embodiments, ground flavor ingredients 22 may be compressed into pellets. In additional embodiments, the flavor ingredients 22, or portions of the flavor ingredients 22, may be preserved whole, such that a person may be able to identify the flavor ingredient 22 by its visual appearance.

The flavor ingredients 22 for each flavor packet 24 may be packaged in a discrete container, such as a bottle, a bag 26, a pouch, or another container. Additionally, the flavor ingredients 22 may be packaged with an inert gas, such as nitrogen, to aid in preservation during storage. Optionally, the flavor ingredients 22 may be placed in a water permeable pouch 28 (e.g., a teabag) prior to sealing in the bag 26. Optionally, a packet of desiccant may also be included with the flavor ingredients 22 that may be separated from the flavor ingredients 22 before the utilization of the flavor ingredients 22.

In some embodiments, a single flavor ingredient 22 may be packaged in a bag 26. In additional embodiments, a plurality of flavor ingredients 22 may be packaged in a bag 26. For example, flavor ingredients 22 having a similar flavor or aroma may be packaged together.

Figure 7:
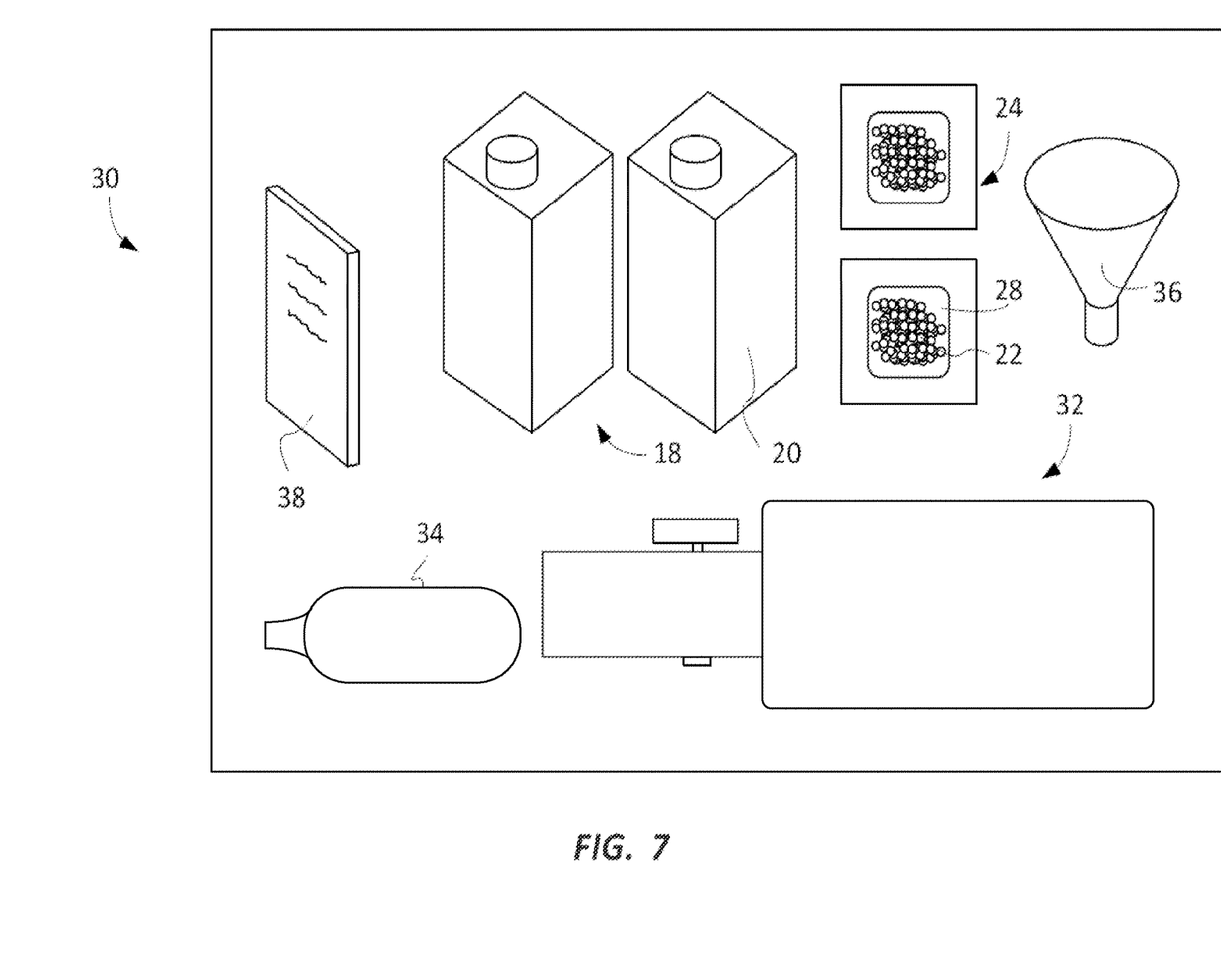
FIG. 7 shows various components of a system for making a personalized malt-based beverage, according to an embodiment of the present disclosure.

In some embodiments, packaged base liquids 18 and flavor packets 24 may be combined in a system 30, such as shown in FIG. 7, for a consumer to utilize in preparing a personalized malt-based beverage, such as a personalized beer. Some systems 30 may include tools to make the personalized malt-based beverage in addition to the packaged base liquid 18 and flavor ingredients.

In one embodiment, a system 30 may include one or more containers 20 of base liquid 18, one or more flavor packs 24 including flavor ingredients 22, and a carbonating vessel 32, as shown in FIG. 7. The system 30 may additionally include a source of carbon dioxide, such as a carbon dioxide cartridge 34, a funnel 36, water permeable pouches 28 (e.g., tea bags, textile and/or porous material) or filters, and instructions 38.

Figure 8:
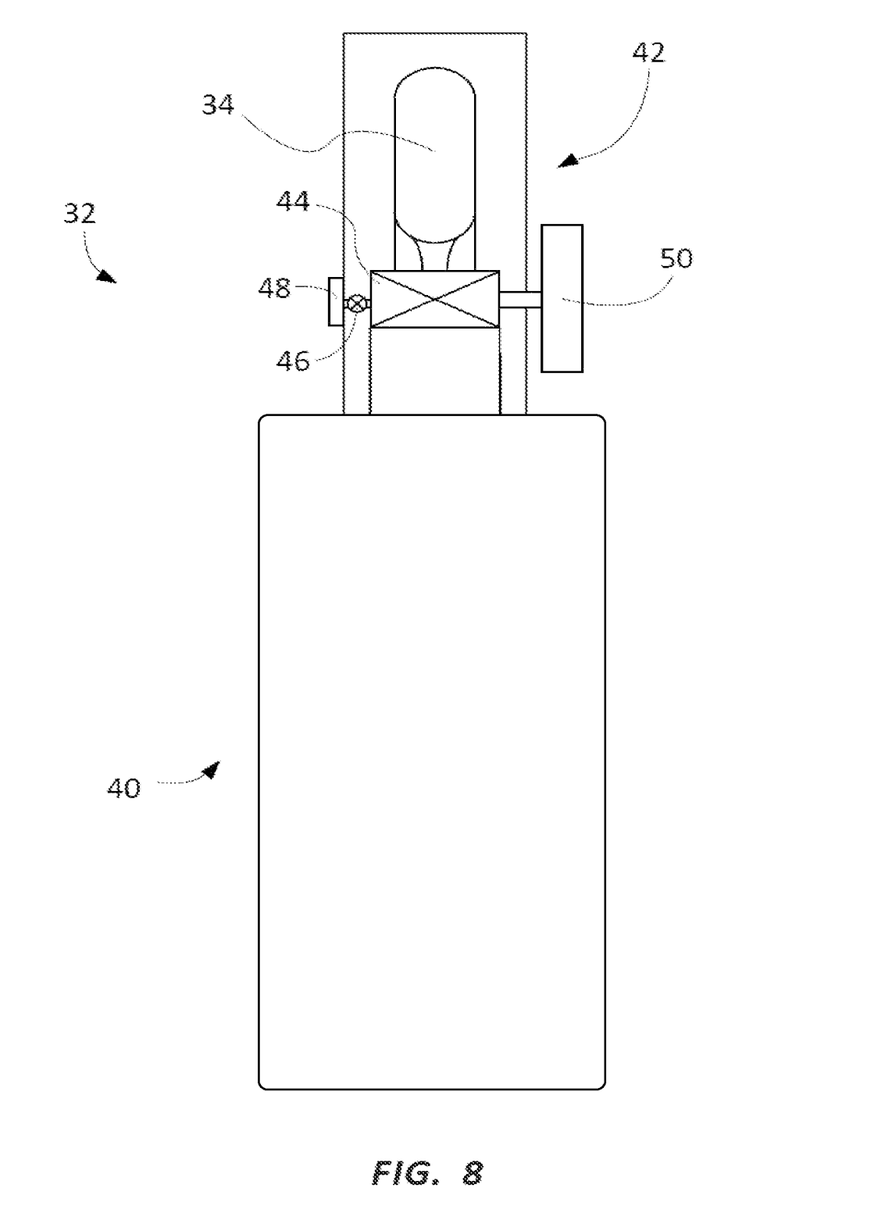
FIG. 8 is a front cross-sectional view of a carbonating vessel for making a personalized malt-based beverage, according to an embodiment of the present disclosure.

As shown in FIG. 8, the carbonating vessel 32 may include a liquid storage area 40, a compressed gas storage area, such as a carbon dioxide storage area 42, and a pressure regulator 44 positioned between the carbon dioxide storage area and the liquid storage area 40. In some embodiments, as shown in FIG. 8, the carbon dioxide storage area 42 may be removable from the liquid storage area 40 of the carbonating vessel 32 to provide an opening for the introduction and removal of liquid from the liquid storage area 40. For example, the liquid storage area 40 may be a bottle formed of spun aluminum and the carbon dioxide storage area 42 may be comprised as a cap that may be screwed onto the top of the aluminum bottle forming the liquid storage area 40 via corresponding threads on the bottle and the cap.

The pressure regulator 44 may be configured to release carbon dioxide gas from the carbon dioxide storage area 44 (e.g., from the carbon dioxide cartridge 34) to the liquid storage area 40 at a controlled rate. For one example, the pressure regulator 44 may be configured to release the carbon dioxide over a period of hours, such as greater than about 6 hours and less than about 36 hours. For another example, the pressure regulator 44 may be configured to release the carbon dioxide over a period of hours, such as between about 12 hours and about 24 hours. Additionally, the pressure regulator 44 may be configured to prevent the pressure in the liquid storage area 40 of the carbonation vessel 32 from exceeding a predetermined amount, to prevent over-carbonation of a liquid stored therein. Furthermore, according to one exemplary embodiment, the pressure regulator 44 may include an on/off valve that provides the consumer the ability to completely regulate or stop the release of carbon dioxide gas from the carbon dioxide storage area 44 to the liquid storage area 40.

The carbonating vessel 32 may also include a pressure relief valve 46. The pressure relief valve 46 may allow a relatively slow, controlled discharge of pressurized gases from the liquid storage area 40, such as by the pressing of a button 48 or another control feature. Accordingly, the pressure relief valve 46 may be utilized for a controlled release of pressure within the liquid storage area 40 and prevent excessive foaming of a carbonated liquid (e.g., a finished beer) stored therein when the liquid storage area 40 is opened.

Figure 9:
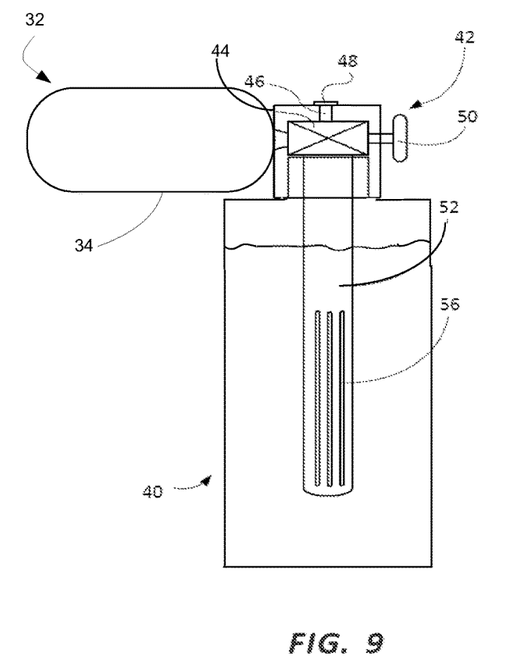
FIG. 9 is a front cross-sectional view of a carbonating vessel for making a personalized malt-based beverage wherein a carbon dioxide cartridge is oriented horizontally, according to an embodiment of the present disclosure.

In further embodiments, the carbonating vessel 32 may include a cap having a carbon dioxide storage area 42 configured to receive a carbon dioxide cartridge 34 in a horizontal orientation, as shown in FIG. 9. Additionally, as shown in FIG. 9, the carbonating vessel may be configured to receive a flavor column 52, which may facilitate the transfer of flavors to a liquid therein during conditioning and storage therein. Although a generally cylindrical flavor column 52 is shown, the flavor column 52 may be another geometric shape, such as a spherical, pyramidal, etc., or may be another shape, such as a flexible tea-bag like structure.

Figures 10A, 10B:
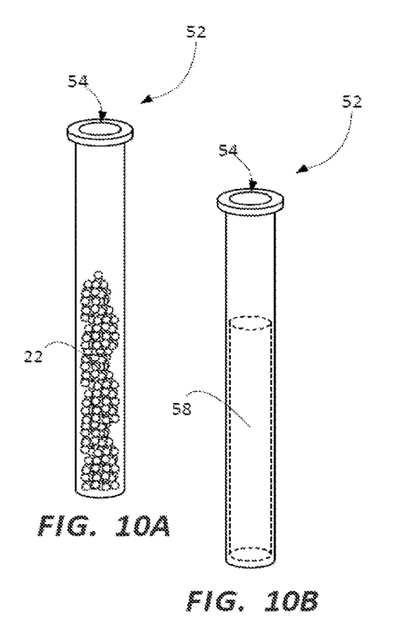
FIGS. 10A and 10B are isometric views of flavor columns for use in a carbonating vessel, such as shown in FIG. 9.
Figure 11:
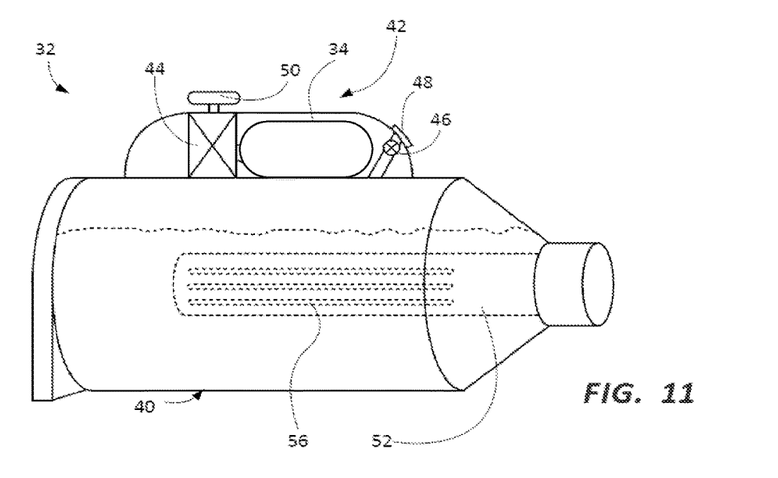
FIG. 11 is a front cross-sectional view of a carbonating vessel for making a personalized malt-based beverage configured to be stored horizontally, according to an embodiment of the present disclosure.

As shown in FIG. 10A and 10B, the flavor column 52 may include an opening 54 at a top thereof. Additionally, as shown in FIGS. 9 and 11, the flavor column 52 may include water permeable openings 56 in a side surface. In some embodiments, the flavor column 52 may be configured to hold a dried flavor ingredient 22, as shown in FIG. 10A. In further embodiments, the flavor column 52 may be configured to hold a flavor liquid 58. Accordingly, the flavor column 52 may include a barrier, such as a thin membrane, between the flavor liquid 58 and the water permeable openings 56. Alternatively, the flavor column 52 may be free of a membrane and include a number of small orifices or other elements that allow for fluid permeability. Additionally, the flavor column 52 may include a oxygen scavenging material therein, such as iron filings, to facilitate the removal of oxygen within the liquid storage area 40 of the carbonating vessel 32.

The flavor column 52 may be provided that includes premeasured and packaged flavor ingredients 22 and/or flavor liquid 58 included therein. Optionally, the flavor column may be provided without flavor ingredients 22 and/or flavor liquid 58 included therein and a consumer may insert desired flavor ingredients 22 and/or flavor liquid 58 through the opening 54. According to one exemplary embodiment of the present system and method, the flavor column may be a disposable flexible member that is packaged and delivered with the non-rigid containers 19, 20, 21 housing the base liquid. According to this exemplary embodiment, the flavor column may be disposable after each use and may be pre-packaged with flavor ingredients 22 and/or flavor liquid 58.

In some embodiments, the carbonating vessel 32 may be configured for upright storage, as shown in FIGS. 8 and 9. A carbonating vessel may also be configured, however, to be stored on its side, as shown in FIG. 11, to facilitate storage thereof. In additional embodiments, the carbonating vessel 32 may be configured to be oriented at an angle, rather than a horizontal or vertical orientation. Additionally, the carbonating vessel 32 may be sized and configured to readily fit within a home refrigerator. The carbonating vessel 32 may be provided in any number of sizes, such as relatively small, single serving sizes (e.g., pint sized) to relatively large sizes (e.g., keg sized).

The carbonating vessel 32 may be configured such that a flavor column 52 may be positioned between the carbon dioxide storage area 42 and the liquid storage area 40, as shown in FIG. 9, such that carbon dioxide may be directed through the flavor column 52 into the liquid storage area 40. In further embodiments, the carbonating vessel 32 may be configured such that a flavor column 52 is positioned within the liquid storage area 40, as shown in FIG. 11, such that carbon dioxide may be directed from the carbon dioxide storage area 42 into the liquid storage area 40 without passing through the flavor column 52.

Figure 12:
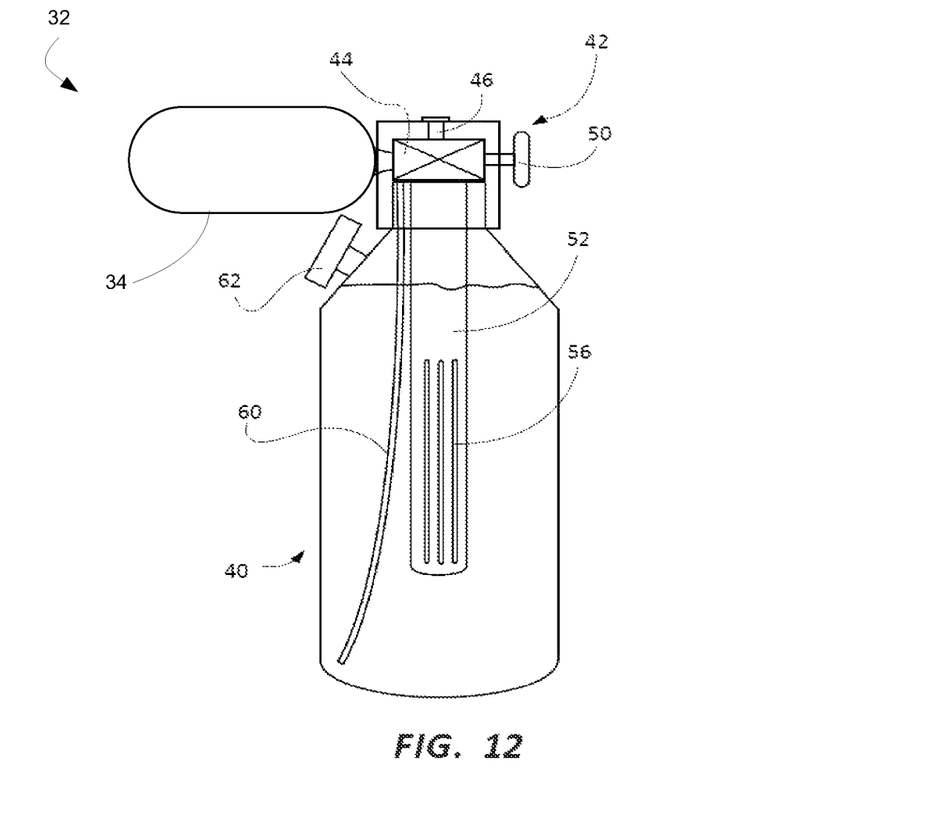
FIG. 12 is a front cross-sectional view of a carbonating vessel for making a personalized malt-based beverage that includes a dip tube, according to an embodiment of the present disclosure.

In further embodiments, as shown in FIG. 12, the carbonating vessel 32 may include a dip tube 60 extending into a liquid storage area 40, the dip tube 60 configured to deliver carbon dioxide from the carbon dioxide storage area 42 to the liquid storage area 40.

The dip tube 60 may be one of a variety of configurations. For example, the dip tube 60 may include a single lumen (e.g., a single bore for fluid delivery), or may include a plurality of lumens (e.g., multiple fluid channels) extending therethrough. In some embodiments, the dip tube 60 may include a single opening into the liquid storage area 40. In further embodiments, the dip tube 60 may include a plurality of openings into the liquid storage area 40. For example, the dip tube 60 may include a plurality of openings along its length. For another example, the dip tube 60 may include one or more porous regions configured to diffuse carbon dioxide into a liquid within the liquid storage area 40 via the pores of each porous region (e.g., the dip tube 60 may include a diffusion stone located at a distal end, or may include porous regions defined by a fibrous material).

In some embodiments, the dip tube 60 may be comprised of hollow fibers, membranes, and/or fiber bundles. The dip tube 60 may have a smooth, cylindrical exterior, or may have a helter-skelter exterior. Additionally, the dip tube 60 may have an open distal end, may include a nozzle at the tip, may include a sparging tip, or may be potted at the distal end.

The dip tube 60 may be removable and replaceable, and may be comprised of an inexpensive and disposable material. Thus, the dip tube 60 may be regularly replaced, such as after each use thereof.

The pressure regulator 44 may be adjustable. Accordingly, a various pressure settings may be selected. For example, a relatively high pressure setting may be selected to provide a relatively highly carbonated liquid, or to reach a desired level of carbonation relatively quickly. Likewise, a relatively low pressure setting may be selected to provide a relatively lowly carbonated liquid, or to reach a desired level of carbonation relatively slowly.

The pressure release valve 46 may be located to release gases from a head space located above liquid within the liquid storage region. Accordingly, if the gases within the head space reach a pressure that exceeds a pressure setting of the pressure release valve 46 the pressure release valve 46 may vent gases from within the head space outside of the carbonating vessel. This may prevent the carbonating vessel from becoming over pressurized.

In some embodiments, the pressure release valve 46 may be adjustable, such as within a range of pressures that are below a maximum safe operating pressure for the carbonating vessel. Accordingly, the pressure release valve 46 may perform multiple functions. The pressure release valve 46 may perform a safety function, preventing over pressurization of the carbonating vessel, and may control the pressure in the carbonating vessel, venting gases from the carbonating vessel until a set pressure is achieved.

By regulating the pressure of the carbonating vessel 32 with the pressure release valve 46, unwanted gases (e.g., nitrogen and/or oxygen found in ambient air) may be vented out and replaced with carbon dioxide. To ensure venting of unwanted gases, the pressure release valve 46 may be set at a pressure that is lower than the pressure regulator 44. Optionally, the pressure release valve 46 may be a manual vent that may be operated after the carbonating vessel has been pressurized to vent unwanted gases from the carbonating vessel.

The manual vent may be configured as a simple release valve, which may be operable to open the head space within the carbonating vessel to the outside and facilitate the equalization of pressure between the carbonating vessel and the ambient environment. In further embodiments, the manual vent may include an adjustable pressure setting (e.g., a dial-in adjustment) which may facilitate the venting of gases from the carbonating vessel until the selected pressure is reached. In yet further embodiments, the manual vent may be a single shot valve, which may vent a metered amount of gas from the head space of the carbonating vessel each time that the single shot valve is activated, such as by depressing a button.

In some embodiments, the pressure release valve 46 may be an automated vent provided to vent gases from the carbonating vessel. For example, the automated vent may be configured to open at specific time intervals, or when a specific pressure is reached.

A pressure gage 62 may measure a pressure within the liquid storage area 40 of the carbonating vessel 32 and display the measured pressure. Optionally, the pressure gage 62 may additionally measure pressures in other regions of the carbonating vessel 32, such as within the carbon dioxide storage area 42, and display these additional measured pressures.

The utilization of the dip tube 60 may result in the formation of froth (i.e., foam) within the liquid storage area 40 of the carbonating vessel 32 as carbon dioxide is released into the liquid stored in the liquid storage area 40. Froth may be undesirable in certain regions of the carbonating vessel 32. For example, the liquid component of froth may damage and/or disable certain components of the carbonating vessel 32, such as valves and gauges, which may be designed to be utilized with relatively clean gases. In view of this, methods and devices may be utilized to manage froth within the carbonating vessel 32.

In some embodiments, froth may be managed by regulating the rate that carbon dioxide is introduced into the liquid storage area 40 through a dip tube 60. In further embodiments, temperature, liquid composition, and other variables that contribute to the formation of froth may be controlled to reduce froth formation.

Additionally, froth that may form in the liquid storage area 40 may be prevented from reaching sensitive areas of the carbonating vessel 32. In some embodiments, one or more froth barriers may be positioned to prevent froth from reaching sensitive areas of the carbonating vessel 32. For example, a gas permeable membrane may be utilized as a barrier. In additional embodiments, a defoaming device or structure may be positioned within the head space of the liquid storage region 40 that may break the surface tension of the liquid films entrapping gas that defines the froth, to facilitate separation of the liquid and the entrapped gas and reduce froth volume.

The base liquid 18 provided in the system 30 may be packaged in containers 20 corresponding to the volume of the liquid storage region 40 of the carbonating vessel 32 to reduce waste.

Optionally, if a rigid container is utilized to package the base liquid, the rigid container may be utilized as the liquid storage area 40 of the carbonating vessel 32.

The components, such as the flavor packets 24, the containers 20 of base liquid 18, the carbonating vessel 32, and the carbon dioxide cartridge 34, and the system 30 may be displayed together to allow the consumer to easily access each component and to understand all of the components and the system. The display may include boxes including the system 30, which may include textual and/or graphical depictions of the contents thereof. The display may additionally include each of the components, such as the flavor packets 24, the containers 20 of base liquid 18, the carbonating vessel 32, the carbon dioxide cartridge 34 displayed and available for purchase separately. Accordingly, a person using the system 30 for the first time my buy a kit that includes each of the components needed to prepare a customized malt-based beverage. Additional components may also be displayed for purchase to make more customized malt-based beverages, without the purchase of reusable components, such as the carbonating vessel 32. Separate components may also be purchased to allow customization outside of the bounds of a prepackaged kit of ingredients, giving the consumer freedom to experiment and explore various customized malt-based beverages.

Items that may be utilized each time the system is used may be provided in a kit. For example, in embodiments wherein a dip tube 60 is utilized with the carbonating vessel 32 a replacement dip tube 60 may be provided with each package of base liquid. Additionally, other consumable items, such as a carbon dioxide cartridge 34, may be provided with each package of base liquid.

Utilizing the various system components described herein, a consumer may prepare a customized fermented beverage, such as a personalized beer. This process may include extracting flavors from various flavor ingredients 22 into flavored liquids, combining the flavored liquids and one or more base liquids 18 to achieve a desired taste, and storing the combined flavored and base liquids in the carbonating vessel 32 to provide a carbonated custom fermented beverage (e.g., a finished custom beer).

Flavor may be extracted from a flavor ingredient 22 utilizing hot water. For example, the flavor ingredient 22 may be boiled, steamed, and/or steeped in water. To extract the flavor by boiling, a pot of water may be heated to a boil on a stovetop. The flavor ingredient packet 24 may be opened and the flavor ingredient 22 may be placed in the boiling water and boiled for a period of time. Boiling the water for a sufficiently long period allows reducing the oxygen therein and is considered beneficial for the taste of the final beverage.

For example, hops may be boiled in water for between about 30 minutes and about 60 minutes to provide a liquid bittering flavor. For another example, hops may be boiled for about 15 minutes or less to provide a liquid aromatic flavor. The solid residue of the flavor ingredients 22 may then be separated from the liquid flavor (i.e., the water and the extracted flavor). For example, a water permeable container 28 holding the ingredient solids residues may be removed from the liquid flavor. For another example, the liquid flavor may be directed through a filter to remove the solids.

To extract the flavor by steaming, the flavor ingredient may be introduced into a container and pressurized steam may be directed through the container. For example, the flavor ingredient may be positioned into an espresso machine and the flavor liquid may be prepared in a manner similar to the preparation of espresso.

To extract the flavor by steeping, the flavor ingredients may be introduced into hot water for a period of time. In some embodiments, the flavor liquid may be prepared using traditional methods for making coffee or tea. For example, steeping roasted cereals, may extract flavors having subtle burned notes typical to some existing beer types.

In some embodiments, flavor may be extracted with a solvent other than, or in addition to, water. For example, flavors may be extracted from a flavor ingredient 22 with a solvent containing ethyl alcohol (e.g., vodka). In further embodiments, the flavor ingredients 22 may be packed and provided to a consumer as a flavor liquid. In yet further embodiments, flavor ingredients 22 may be provided as a paste, a gel, a suspension, a powder, a solid, a liquid, or a combination thereof, which may require flavor extraction, or which may be added directly to the base liquid as a flavor ingredient.

After each of the flavor liquids have been prepared, and optionally cooled to room temperature, a consumer may combine chosen prepared flavor liquids with one or more chosen base liquids 18 in a ratio to the consumers liking. If more than one base liquid 18 is used, the consumer may combine the base liquids 18 as desired. For example, a light base liquid 18 and a dark base liquid 18 may be combined in a ratio that achieves a darkness that is to the consumers liking For another example, a light base liquid 18 having a relatively low ethyl alcohol content may be combined with a strong base liquid 18 having a relatively high ethyl alcohol content at a ratio that achieves a desired ethyl alcohol content.

The consumer may incrementally add flavor liquid to the base liquid 18 until the combined liquids have an organoleptic profile (e.g., a taste and a smell) that is pleasing to the consumer. The consumer may incrementally add a bittering flavor liquid until a desired bitterness is achieved. The consumer may then incrementally add an aromatic flavor liquid until a desired aroma and taste is achieved. Additionally, the consumer may add one or more of a spice flavor, a fruit flavor, a wood flavor, and/or additional flavor liquids, until a desired taste and aroma is achieved.

By mixing base liquids 18 and experimenting with various flavor ingredients 22, the end consumer can manufacture a personalized beverage, fine-tuned to his or her preference. Additionally, restaurants can produce various types of unique malt-based beverages perfectly matching a specific dish offered with minimum of effort and in relatively small volumes, matching their actual needs. As various flavor ingredients 22 and various base liquids 18 may be available, and they may be combinable in various amounts and combinations, an infinite number of personalized fermented beverages may be prepared with the system 30. Accordingly, a consumer may mix and match flavor ingredients 22 and base liquids 18 to explore numerous beer varieties and flavors utilizing relatively few components.

The combined base and flavor liquids may be combined within the liquid storage area 40 of the carbonating vessel 32, or the combined base and flavor liquids may be poured into the liquid storage area 40 of the carbonating vessel 32. To prepare the carbonating vessel 32 for use, a carbon dioxide cartridge 34 may be inserted into the carbon dioxide storage area 42. The opening to the liquid storage area 40 may then be closed by the cap comprising the carbon dioxide storage area 42. Upon closure of the liquid storage area 40 the pressure regulator 44 may allow carbon dioxide to flow into the liquid storage area 40. For example, a knob 50 or other control feature may be operated by the consumer to activate the release of carbon dioxide. Optionally, the cap may be configured to allow trapped air in a headspace above the liquid in the liquid storage area 40 to be vented and replaced by carbon dioxide prior to pressurization.

Optionally, flavor liquids may be added to the base liquid after the base liquid has been carbonated in the carbonating vessel 32.

If a flavor column 52 is utilized as shown in FIG. 9, a membrane may be broken by the release of carbon dioxide from the carbon dioxide storage area 42 and flavors may be directed from the flavor column into the liquid storage area 40 through the water permeable openings 56.

The carbonating vessel 32 may then be placed in a refrigerator to be cooled. Over a period of time, such as a time period between about 12 hours and about 24 hours, the combined liquid may become conditioned and a certain amount of carbon dioxide may become dissolved in the combined liquid. After the combined liquid is carbonated it may provide a finished customized malt-based beverage, such as beer, that is ready to be consumed. The cap may be removed from the bottle containing the liquid storage area 40 and the finished fermented beverage (e.g., beer) may be poured into containers for consumption. Accordingly, in addition to providing carbonation, the liquid storage area 40 of the carbonating vessel may be utilized as a pitcher or growler for serving finished fermented beverage and as a storage container for finished fermented beverage. A separate cap may be provided for serving and storing finished fermented beverage after carbonation, or the cap comprising the carbon dioxide storage area 42 may be utilized for storing the finished fermented beverage after carbonation thereof. In view of this, a separate pitcher is not required for serving finished fermented beverage, providing ease of use and reduced cleanup.

In some embodiments, a cartridge of compressed nitrogen (N2) may be positioned into a gas storage area of a carbonating vessel 32 and nitrogen may be introduced into a fermented beverage, such as a stout or cream ale style beer, which may provide a creamy head and mouth feel associated with such fermented beverages.

To facilitate the making of a fermented beverage, such as a specific style of beer, instructions 38 for duplicating popular beers may be provided in the system 30, or may otherwise be made available to the consumer. The instructions 38 may include one or more recipes, which may specify specific amounts of specific base liquids to be used, specific flavor ingredients to be used, how the flavors should be extracted, and how much of resulting flavor liquids should be added for specific beer styles. In some embodiments, a recipe may include exact quantities and ingredients. In additional embodiments, a recipe may include ranges of suggested ingredients, so that the consumer may get a general idea of how to achieve a specific beer style, but feel free to customize the beer style to their liking.

A recipe may also include additional information about a specific style of beer, like the history of the beer variety and other information to educate the consumer and provide an emotional connection between the consumer and the beer that they are crafting.

The system 30 may additionally include worksheets to facilitate recording a custom recipe (i.e., how a consumer prepared a batch of beer), so that later the consumer may be able to duplicate the beer again or share their recipe with others.

Finally, in some embodiments, software may be made available, such as via the internet or on a digital storage medium (e.g., a compact disc), to provide recipes and information to the consumer. The software may be configured to be utilized with a desktop computer, a laptop computer, a tablet computer, and/or a handheld computer (e.g., a smartphone). The software may be utilized to provide recipes, to record recipes created by consumers, to share recipes (e.g., via social networking channels), and for related discussion. The software may allow consumers to network with other consumers regarding the customization of malt beverages utilizing systems and devices such as described herein to share their experiences. Additionally, the software may be configured to prompt a user for a beer style or taste preference. In response to an input by the user, the software may generate a flavor ingredient and base liquid combination suggestion to the user.

The preceding description has been presented only to illustrate and describe exemplary embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A system for carbonating a personalized beverage, the system comprising:
a base container including at least one sidewall defining a liquid storage area;
a pressure regulator configured to be sealingly coupled to said base container; and
a carbon dioxide cartridge configured to selectively release carbon dioxide when engaged with said pressure regulator;
wherein said pressure regulator includes an on/off valve that opens and closes to control a release of the carbon dioxide from the carbon dioxide cartridge;
wherein when actuated, the pressure regulator causes the carbon dioxide cartridge to release said carbon dioxide from said carbon dioxide cartridge at a rate that releases all of the carbon dioxide in the carbon dioxide cartridge into a beverage within said liquid storage over a period of time greater than 6 hours and less than 24 hours.

2. The system of claim 1, further comprising an oxygen scavenging member coupled to said carbon dioxide cartridge.

3. The system of claim 1, wherein said base container comprises a metal container.

4. The system of claim 3, wherein said base container comprises an aluminum container.

5. The system of claim 1, wherein the system further comprises a pressure release valve configured to release pressure when a carbonation threshold value within said base container is exceeded.

6. The system of claim 1, wherein said base container and said carbon dioxide storage member each comprise mating engagement features configured to sealingly engage said carbon dioxide cartridge to said base container.

7. The system of claim 6, wherein said mating engagement features comprise threaded elements.

8. The system of claim 1, wherein said carbon dioxide storage member comprises a cap configured to fluidly seal said liquid storage area of said base container.

9. The system of claim 1, further comprising a cartridge engagement feature formed on said carbon dioxide cartridge, wherein said cartridge engagement feature is configured to securely couple said carbon dioxide cartridge to said carbon dioxide cartridge.

10. The system of claim 9, wherein said cartridge engagement feature is configured to orient said carbon dioxide cartridge in a vertical orientation when said carbon dioxide cartridge is coupled to said cartridge engagement feature.

11. The system of claim 9, wherein said cartridge engagement feature is configured to orient said carbon dioxide cartridge in a horizontal orientation when said carbon dioxide cartridge is coupled to said cartridge engagement feature.

12. The system of claim 1, wherein said carbon dioxide cartridge further comprises a pressure relief valve.

13. The system of claim 12, wherein the pressure relief valve is configured to release pressure in response to the pressing of a button.

14. The system of claim 12, wherein the pressure relief valve is positioned to release pressure from a head space.

15. The system of claim 1, further comprising a dip tube extending from the carbon dioxide cartridge into the liquid storage area.

16. The system of claim 15, further comprising a froth management feature.

17. A system for carbonating a personalized beverage, the system comprising:
   a base container including at least one sidewall defining a liquid storage area;
   a carbon dioxide cartridge configured to be sealingly coupled to said base container;
   a dip tube extending from the carbon dioxide storage area into the liquid storage area; and
   a froth management feature; and
   wherein said carbon dioxide cartridge further comprises a pressure regulator includes an on/off valve that opens and closes to control a release of the carbon dioxide from the carbon dioxide cartridge;
   wherein the pressure regulator is configured to selectively release carbon dioxide all of the carbon dioxide in the carbon dioxide cartridge through the dip tube into said liquid storage area between a period of 6 to 24 hours.

18. The system of claim 17, wherein the froth management feature comprises a gas permeable membrane.

19. The system of claim 17, wherein said carbon dioxide cartridge further comprises a pressure relief valve.

\* \* \* \* \*